United States Patent
Chen et al.

(10) Patent No.: US 9,886,640 B1
(45) Date of Patent: Feb. 6, 2018

(54) METHOD AND APPARATUS TO IDENTIFY A LIVE FACE IMAGE USING A THERMAL RADIATION SENSOR AND A VISUAL RADIATION SENSOR

(71) Applicant: International Business Machines Corporation, Armonk, NY (US)

(72) Inventors: Chia-Yu Chen, White Plains, NY (US); Pierce I-Jen Chuang, Briarcliff Manor, NY (US); Li-Wen Hung, Mahopac, NY (US); Jui-Hsin Lai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/230,934

(22) Filed: Aug. 8, 2016

(51) Int. Cl.
G06K 9/00 (2006.01)
G06K 9/62 (2006.01)
G06F 21/32 (2013.01)

(52) U.S. Cl.
CPC ......... G06K 9/00906 (2013.01); G06F 21/32 (2013.01); G06K 9/00255 (2013.01); G06K 9/00261 (2013.01); G06K 9/00281 (2013.01); G06K 9/00288 (2013.01); G06K 9/6215 (2013.01)

(58) Field of Classification Search
CPC .......... G06K 9/00906; G06K 9/00255; G06K 9/00261; G06K 9/00281; G06K 9/00288; G06K 9/6215; G06F 21/32
See application file for complete search history.

(56) References Cited

U.S. PATENT DOCUMENTS

| | | |
|---|---|---|
| 2010/0188521 A1 | 7/2010 | Minagawa et al. |
| 2011/0221599 A1 | 9/2011 | Hogasten |
| 2014/0184854 A1 | 7/2014 | Musatenko |
| 2015/0347841 A1* | 12/2015 | Mears .............. G06K 9/00604 348/46 |

(Continued)

FOREIGN PATENT DOCUMENTS

| | | |
|---|---|---|
| WO | 0150195 A1 | 7/2011 |
| WO | 2016022008 A1 | 2/2015 |
| WO | 2015178580 A1 | 11/2015 |

OTHER PUBLICATIONS

A. Mogelmose et al., "Tri-Modal Person Re-Identification With RGB, Depth and Thermal Features", 2013 IEEE Conference on Computer Vision and Pattern Recognition Workshops, Mar. 2013 pp. 301-307.

*Primary Examiner* — David F Dunphy
(74) *Attorney, Agent, or Firm* — Harrington & Smith (57) ABSTRACT

A method, system and computer program product are disclosed that comprise capturing first image data of a person's face using at least one sensor responsive in a band of infrared wavelengths and capturing second image data of the person's face using the at least one sensor responsive in a band of visible wavelengths; extracting image features in the image data and detecting face regions; applying a similarity analysis to image feature edge maps extracted from the first and the second image data; and recognizing a presence of a live face image after regions found in the first image data pass a facial features classifier. Upon recognizing the presence of the live face image, additional operations can include verifying the identity of the person as an authorized person and granting the person access to a resource.

20 Claims, 9 Drawing Sheets

(56) References Cited

U.S. PATENT DOCUMENTS

| | | |
|---|---|---|
| 2016/0044228 A1 | 2/2016 | Kim et al. |
| 2016/0086018 A1* | 3/2016 | Lemoff ............. G06K 9/00295 382/118 |
| 2016/0097857 A1* | 4/2016 | Gokay ...................... F41G 3/06 356/5.01 |
| 2017/0193285 A1* | 7/2017 | Negi .................. G06K 9/00288 |

* cited by examiner

METHOD AND APPARATUS TO IDENTIFY A LIVE FACE IMAGE USING A THERMAL RADIATION SENSOR AND A VISUAL RADIATION SENSOR

TECHNICAL FIELD

The embodiments of this invention relate generally to biometric authentication techniques using image acquisition and processing apparatus and methods and, more specifically, to methods and apparatus to identify a live facial image of a person.

BACKGROUND

The authentication of persons using biometric input data is growing in importance. The authentication can be used in order to grant a person access to a physical space, e.g., an office or a mode of transportation, or to a virtual space, such as a financial account, or to grant the person the right to make a monetary transaction or to use a device such as a personal communication device, as a few non-limiting examples. It is therefore important to reduce an occurrence of erroneous and fraudulent biometric authentications, such as those based on the recognition of an image (e.g. a facial image) of an authorized person.

SUMMARY

In a first aspect thereof the embodiments of this invention provide a method that comprises capturing first image data of a person's face using at least one sensor responsive in a band of infrared wavelengths and capturing second image data of the person's face using the at least one sensor responsive in a band of visible wavelengths; extracting image features in the image data and detecting face regions; applying a similarity analysis to image feature edge maps extracted from the first and the second image data; and recognizing a presence of a live face image after regions found in the first image data pass a facial features classifier that identifies a presence of an image of a human face in the first image data.

In a further aspect thereof the embodiments of this invention provide a system comprised of at least one data processor connected with at least one memory that stores software instructions. Execution of the software instructions by the at least one data processor causes the system to capture first image data of a person's face using at least one sensor responsive in a band of infrared wavelengths and capture second image data of the person's face using the at least one sensor responsive in a band of visible wavelengths; to extract image features in the image data and detecting face regions; to apply a similarity analysis to image feature edge maps extracted from the first and the second image data; and to recognize a presence of a live face image after regions found in the first image data pass a facial features classifier that identifies a presence of an image of a human face in the first image data.

In another aspect thereof the embodiments of this invention provide a computer program product comprised of software instructions on a computer-readable medium, where execution of the software instructions using a computer results in performing operations comprising capturing first image data of a person's face using at least one sensor responsive in a band of infrared wavelengths and capturing second image data of the person's face using the at least one sensor responsive in a band of visible wavelengths; extracting image features in the image data and detecting face regions; applying a similarity analysis to image feature edge maps extracted from the first and the second image data; and recognizing a presence of a live face image after regions found in the first image data pass a facial features classifier that identifies a presence of an image of a human face in the first image data.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention.

A facial recognition system can be used to provide a person with access to some location/functionality/resource (e.g., a physical or a virtual location/functionality/resource) with or without the use of some secondary information such as a password. A vulnerability of current facial recognition techniques relates to a susceptibility to being misled and giving a false positive result if an image of a person's face, e.g., a color photograph, is placed before the image recognition sensor instead of the person's actual ('live') face.

In order to overcome this vulnerability the exemplary embodiments of this invention provide for a dual image recognition sensor system to be used, wherein one sensor is responsive to light (electromagnetic radiation) in the visible spectrum (e.g., a red-green-blue (RGB) image sensor responsive to wavelengths in a range of about 390 nm to about 700 nm), while another sensor is responsive to light outside of the visible spectrum, such as light in the infrared (IR) spectrum (e.g., in a range of about greater than 700 nm (near IR) to about 1 mm (far IR)).

Figures 1A, 1B:
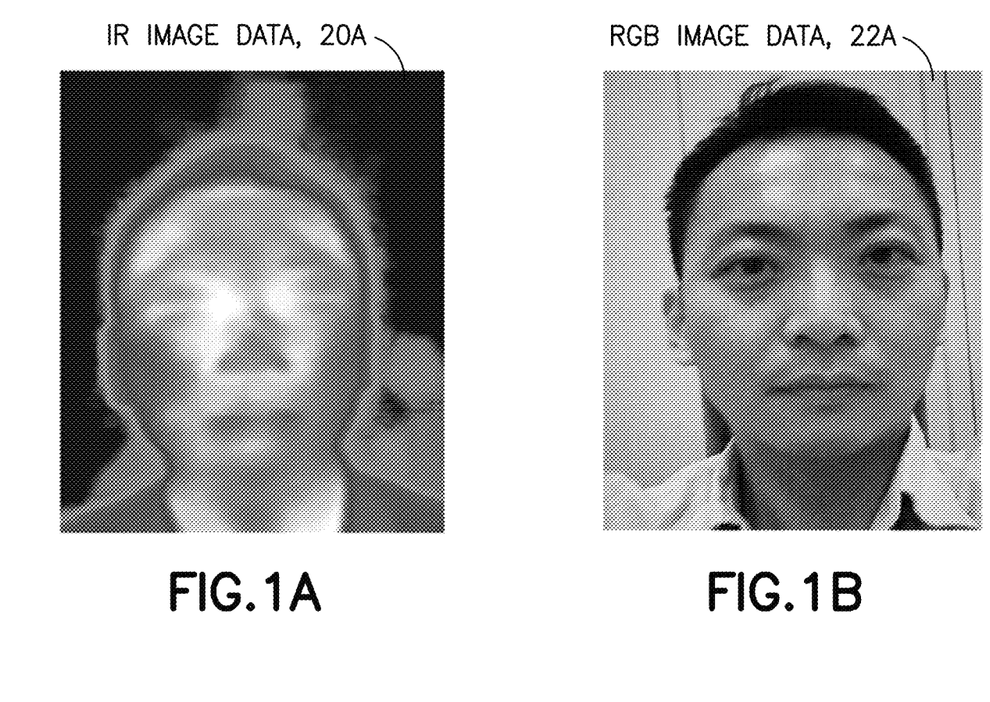
FIGS. 1A and 1B show examples of a thermal image of a person's face and an RGB image of the person's face, respectively.

FIG. 1A shows an example of a thermal image of a person's face while FIG. 1B shows an example of a corresponding RGB image of the same person's face. Using an IR sensor a person's facial temperature distribution can be imaged as shown in FIG. 1A. The resulting IR image may be assumed to represent a biometric signature of the person that correlates with the person's facial features. For example, the IR image is descriptive a least in part of the distribution and density of capillaries in the skin around the eyes, cheeks and mouth of the person, where the skin temperature around the eyes is generally greater than the skin temperature of the cheeks. The IR features of the image, e.g., facial regions of substantially the same temperature, can then be registered with the facial features image (FIG. 1B) captured by the RGB sensor. For example, facial regions corresponding to the cheeks, nose, regions around the eyes, etc., appearing in both the thermal and RGB images are registered one to another within some pixel distance tolerance range [r1, r2]. In this case r is the pixel distance on an image. The physical distance can be mapped to the pixel distance with the camera's focal length. As a non-limiting example, for a 30 mm focal length camera, [r1, r2] [5, 40] mapping to a distance of [0.2 m, 1.5 m].

An aspect of the registration process can be a compensation for spatial differences between the two images (the IR image and the RGB image) due to, for example, a difference in the locations of the IR sensor and the RGB sensor relative each other and to the location of and distance to the person's face. An end result, after passing an IR facial feature classifier, is an ability to declare that what was imaged was or was not an actual 'live' human face.

Once it is ascertained that what was presented to the imaging system was a 'live' human face the embodiments of this invention then enable the imaged face to be compared to a collection of tagged facial images in order to identify the person associated with the imaged face. That is, facial image data can be compared to stored image data to verify the identity of the person as an authorized person. The image data that is compared could be a spatially registered combination of the IR and RGB image data, or it could be separate IR and RGB image data (e.g., an image database contains both IR and RGB images of the same person), or it could be just the RGB image data.

If the IR image sensors fails to capture an image with some minimum amount of facial temperature distribution, such as if the IR sensor is presented with just a picture of the person's face or with a three dimensional model of the person's face, then the authentication procedure can indicate a failure to authenticate the person as an authorized person to gain access to some physical or virtual location/functionality/resource of interest.

It is pointed out that while this description refers to the use of RGB image data, in some embodiments the visible spectrum image data could be black and white or grayscale image data.

Figure 2A:
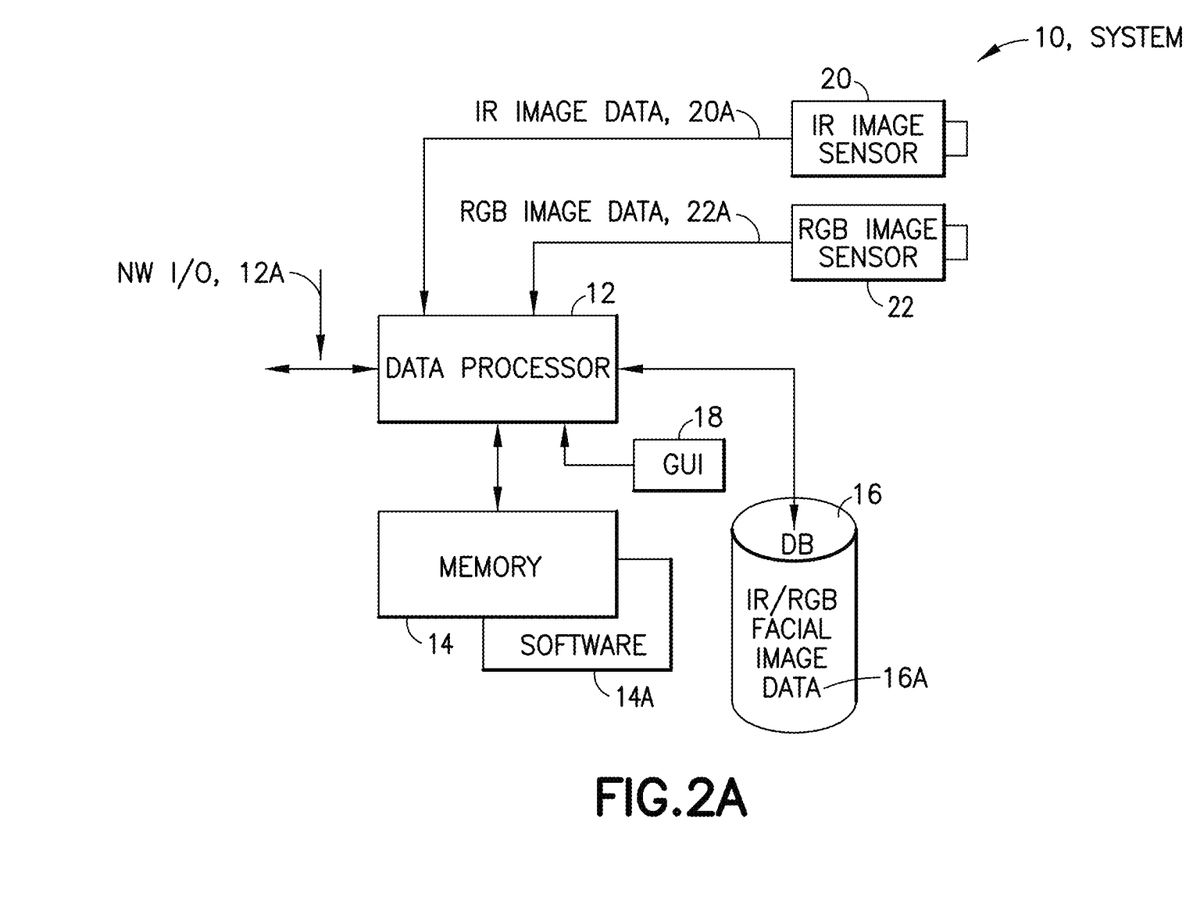
FIGS. 2A and 2B are each a block diagram of a system that is suitable for use in implementing and practicing the embodiments of this invention.

FIG. 2A is a block diagram of a first embodiment of a system 10 that is suitable for use in implementing and practicing the embodiments of this invention. System 10 includes at least one controller/data processor 12 connected with at least one memory 14 that stores software (SW) 14A. The software 14A can include those programs and applications that are desirable to run to perform thermal and RGB image processing and authentication in accordance with embodiments of this invention. Bi-directionally connected with the at least one controller/data processor 12 can be a database (DB) 16 that can stored pre-recorded IR/RGB facial image data 16A for any number of persons that are desired to be authenticated. The data processor 12 is also connected with interfaces/adapters (e.g., network input/output (NW I/O) 12A) that are configured to receive data from various sources and to send data to various sinks. The NW I/O 12A can provide wired and/or wireless connections to any number of and types of networks, including intranets, cellular communication networks, WiFi networks and the internet. Also connected with the at least one controller/data processor 12 may be at least one display/data entry device such as a graphical user interface (GUI) 18 that enables a user of the system 10 to visualize imaged facial data and other information.

Also connected to the data processor 12 in the embodiment of FIG. 2A is an IR image sensor 20 that outputs the IR image data 20A (e.g., FIG. 1A) and a RGB image sensor 22 that outputs the RGB image data 22A (e.g., FIG. 1B). The two image sensors 20 and 22 could be present in the same device, such as a portable communication device (e.g., a smartphone) or a security camera, or one could be present in a first device and the other present in a second device, or one could be present in a device while the other could be fixedly or movably mounted on or to some structure.

Figure 2B:
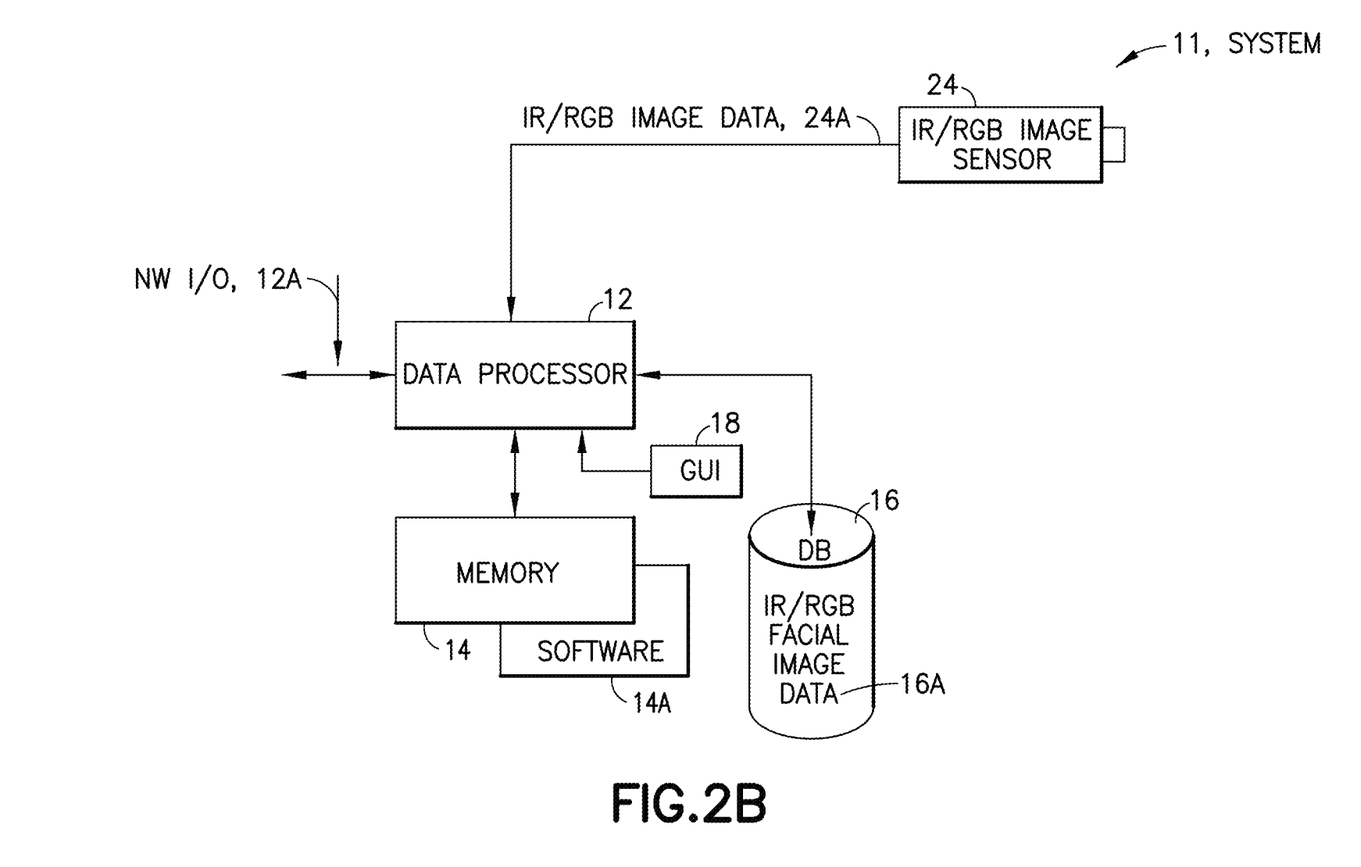

FIG. 2B is a block diagram of a second system 11 that is also suitable for use in implementing and practicing the embodiments of this invention. In the embodiment of FIG. 2B like-numbered components as in FIG. 2A can be functionally the same or similar. One distinction is that in FIG. 2B there is but a single broadband IR/RGB image sensor 24 that outputs IR/RGB image data 24A. In this embodiment the image sensor 24 could be engineered to be responsive to a band of wavelengths that encompasses at least a portion of interest of the visual and the thermal bands. Alternatively there could be two separate image sensors, one responsive to thermal wavelengths and one responsive to visual wavelengths, that are co-located within the same sensor package and that can be operated simultaneously or sequentially. Any desired wavelength filters and the like may be incorporated into or in conjunction with the sensor package(s).

In general the various components shown in FIGS. 2A and 2B can be implemented in whole or in part as circuitry and/or as separate special purpose data processor/controllers and/or as software. The various components shown in FIGS. 2A and 2B can be implemented in whole or in part within a portable user device such as a communication device or a tablet computer or a laptop computer, etc. The systems 10 and 11 can be physically instantiated in whole or in part as one or more computers and computing systems at an enterprise, such as at a security enterprise, or they could be, for example, instantiated at an agency or an academic institution or a research facility or a transportation hub or, in general, at any location where it is desirable to authenticate persons so as to control their access to virtual and/or physical spaces and/or to information. In some embodiments the systems 10 and 11 can be instantiated at least in part in a virtual manner in the cloud.

Figure 3A:
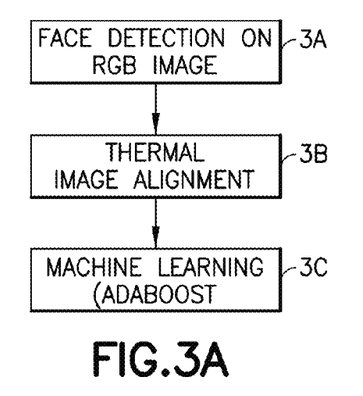
FIG. 3A is a logic flow diagram that is illustrative of an exemplary embodiment of a process in accordance with this invention.
Figure 3B:
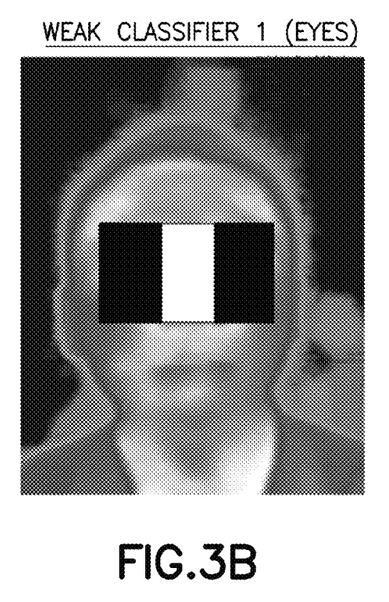
FIGS. 3B and 3C show non-limiting examples of weak (facial) classifiers.
Figure 3C:
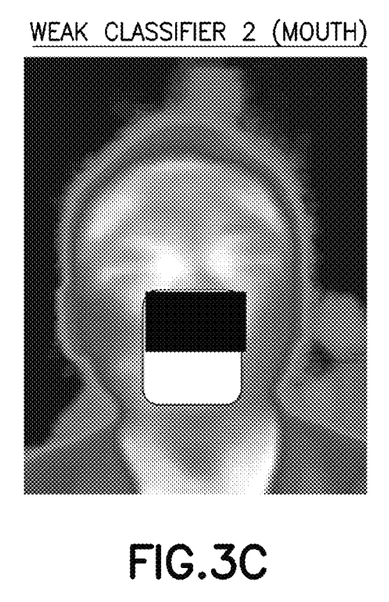

FIG. 3A is a logic flow diagram that is illustrative of an exemplary embodiment of a process in accordance with this invention. At Block 3A, after capturing both the thermal image data 20A and the RGB image data 22A, the software 14A attempts to detect a person's face in the RGB image data. If this is successful at Block 3B the software 14A performs a thermal image data alignment with the RGB image data to verify that the RGB and thermal image data can be aligned within some range of alignment distances. This is followed by a machine learning process (Block 3C) to extract facial thermal features and, in one non-limiting embodiment, the application of Adaptive Boosting (Adaboost) to collect weak classifiers. Examples of weak classifiers are shown in FIGS. 3B (weak classifier for eyes) and 3C (weak classifier for mouth) relative to the thermal image of FIG. 1A. If the tests pass the system 10 or 11 verifies that the face presented to the image sensors 20/22 or 24 is a 'live' human face and not a photograph or a three dimensional model or some other non-live facial representation.

Abstract Boosting or Adaptive Boosting (Adaboost) is a known approach to machine learning that is based on the idea of creating a highly accurate prediction rule by combining several relatively weak and inaccurate rules. The output of other learning algorithms (so-called 'weak learners') is combined into a weighted sum that represents the final output of a boosted classifier. Adaboost is adaptive in the sense that subsequent weak learners are adjusted in favor of those instances misclassified by previous classifiers.

It is pointed out that, as used herein, the Adaboost classifier is an exemplary embodiment of a face detector, more specifically a thermal image face detector. In other embodiments of this invention the Adaboost classifier can be replaced with another method to perform face detection, such as a Convolution Neuron Network (CNN) method. The CNN is a type of feed-forward artificial neural network in which a connectivity pattern between neurons is based on the organization of the animal visual cortex, where individual neurons are so arranged that they respond to overlapping regions that tile a visual field. Thus, the use and the practice of the teachings of this invention are not to be restricted to any one particular type of face detector or face detection methodology.

Processing of the face images can include delineating image regions with similar image pixel characteristics, such as contiguous pixel regions of a certain color or grayscale value indicating a similar temperature. The temperature distribution of an imaged object (e.g., a face) is correlated with the shape of the object.

An example of a gradient equation that can be applied to the face region in the image data is as follows:

$$d^* = \underset{d}{\operatorname{argmin}} \sum_x \sum_y |E_t(x, y) - \tilde{E}_v^d(x, y)|^2,$$

where $E_t(x,y)$ is the edge map (gradient map) of the thermal image, and where
$\tilde{E}_v^d(x,y)$ is the edge map (gradient map) of RGB image with a displacement d.

It is desirable to minimize the difference (displacement) between the edge maps of the thermal and the RGB images.

The embodiments of this invention provide in one non-limiting aspect thereof a process that runs face detection on the RGB image, applies the foregoing gradient equation on the face region, calculates the alignment distance that should be located within [r1, r2], and determines if the data that represents the thermal image passes the Adaboost classifier as representing a human face.

Figure 4:
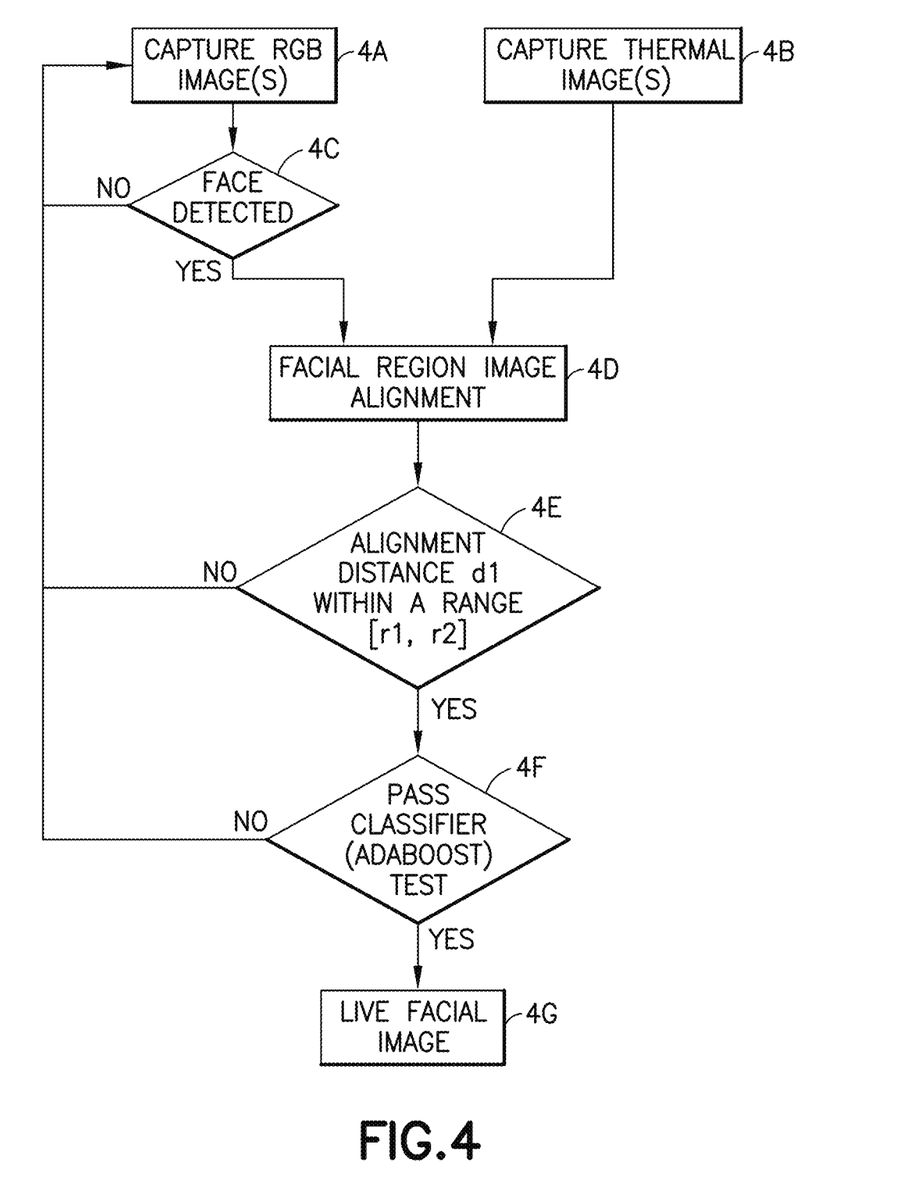
FIGS. 4, 5, 6, 7 and 8 each show a non-limiting example of a process flow in accordance with embodiments of this invention.

Reference in this regard can be made to the process flow depicted in FIG. 4. At Blocks 4A and 4B the system 10 captures RGB and thermal images. At Block 4C a test is made to determine if a face is detected in the RGB image. If a face is detected control passes to Block 4D (otherwise the process restarts and captures more images) to perform a facial region image alignment between the RGB facial image and the thermal facial image. If the alignment distance d1 is found to be located within the pixel distance range of [r1, r2] then the thermal image classifier test is performed at Block 4F to determine if a human face is presented in the thermal image. If this passes then a live facial image is declared to be present, otherwise the process can restart to capture additional images.

Figure 5:
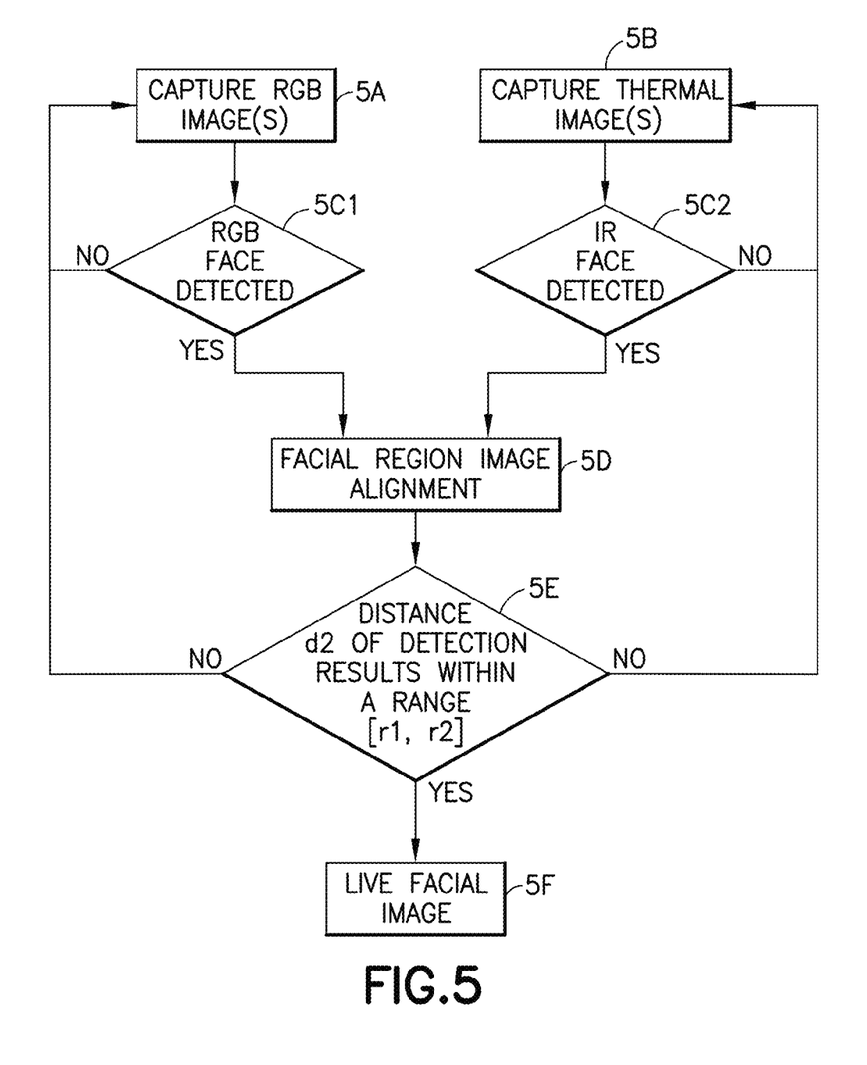

Reference can also be made to the further process flow embodiment depicted in FIG. 5. FIG. 5 is similar to the process flow of FIG. 4 except that there are preliminary steps of detecting if a face is present in both the RGB image data and in the thermal image data. At Blocks 5A and 5B the system 10 captures RGB and thermal images. At Block 5C1 a test is made to determine if a face is detected in the RGB image, and at Block 5C2 another test is made to determine if a face is detected in the thermal image. Only if a face is detected in both the RGB and the thermal images does control pass to Block 5D to perform the facial region image alignment between the RGB facial image and the thermal facial image. If an alignment distance d2 in this case is found to be located within a distance range of [r1, r2] then a live facial image is declared to be present at Block 5F, otherwise the process can restart to capture additional images.

Figure 6:
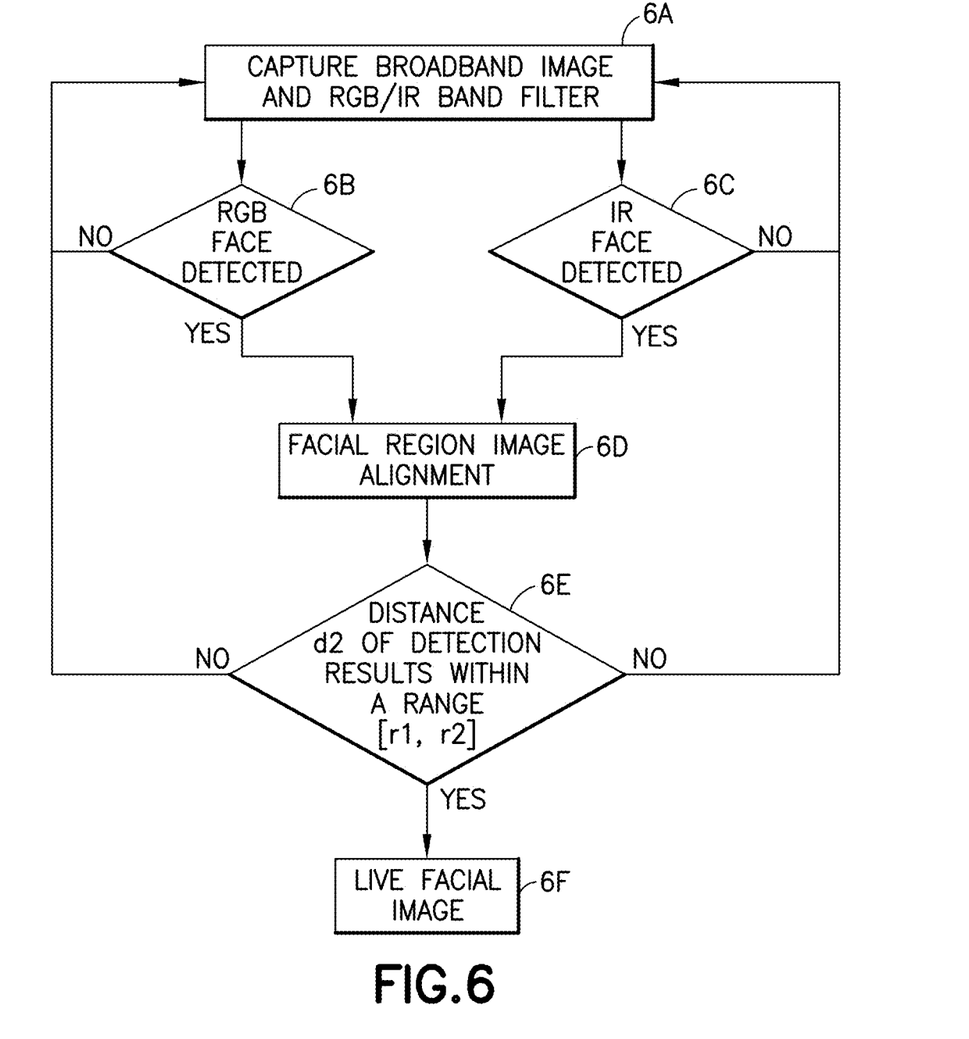

Reference can also be made to the further process flow embodiment depicted in FIG. 6. FIG. 6 is similar to the process flow of FIG. 5 but deals specifically with the case of the system 11 shown in FIG. 2B wherein there is a single IR/RGB image sensor 24. At Block 6A the IR/RGB image sensor 24 of the system 11 captures both RGB and thermal images. At Block 6B a test is made to determine if a face is detected in the RGB image, and at Block 6C another test is made to determine if a face is detected in the thermal image. Assuming that a face is detected in both the RGB and the thermal images control passes to Block 6D to perform the facial region image alignment between the RGB facial image and the thermal facial image. If the alignment distance d2 is found to be located within the distance range of [r1, r2] then a live facial image is declared to be present at Block 6F, otherwise the process can restart to capture additional images.

Each of the methods shown in FIGS. 4, 5 and 6 can include additional steps, after Blocks 4G, 5F and 6F, respectively, of attempting to match the image of the face, which is verified as being a live face image, with face images from a library of face images to detect a match and thereby possibly identify the person whose face has been imaged.

It is noted that the same face detector can be used to process the RGB data as well as the thermal data, or two different face detectors can be used, one for the RGB data and the other one for the thermal data. In practice it may be desirable to use a single face detector, e.g., an Adaboost-based face detector, for both the RGB and the thermal images but with different thresholds, parameters, and weak classifiers. For example, a first weak classifier for the thermal image of FIG. 1A could focus on the eye region while a first weak classifier for the RGB image of FIG. 1B could focus on the nose region. The specific thresholds, parameters and the weak classifiers for use with the Adaboost procedure can be determined by a training phase with both RGB and thermal images.

Figure 7:
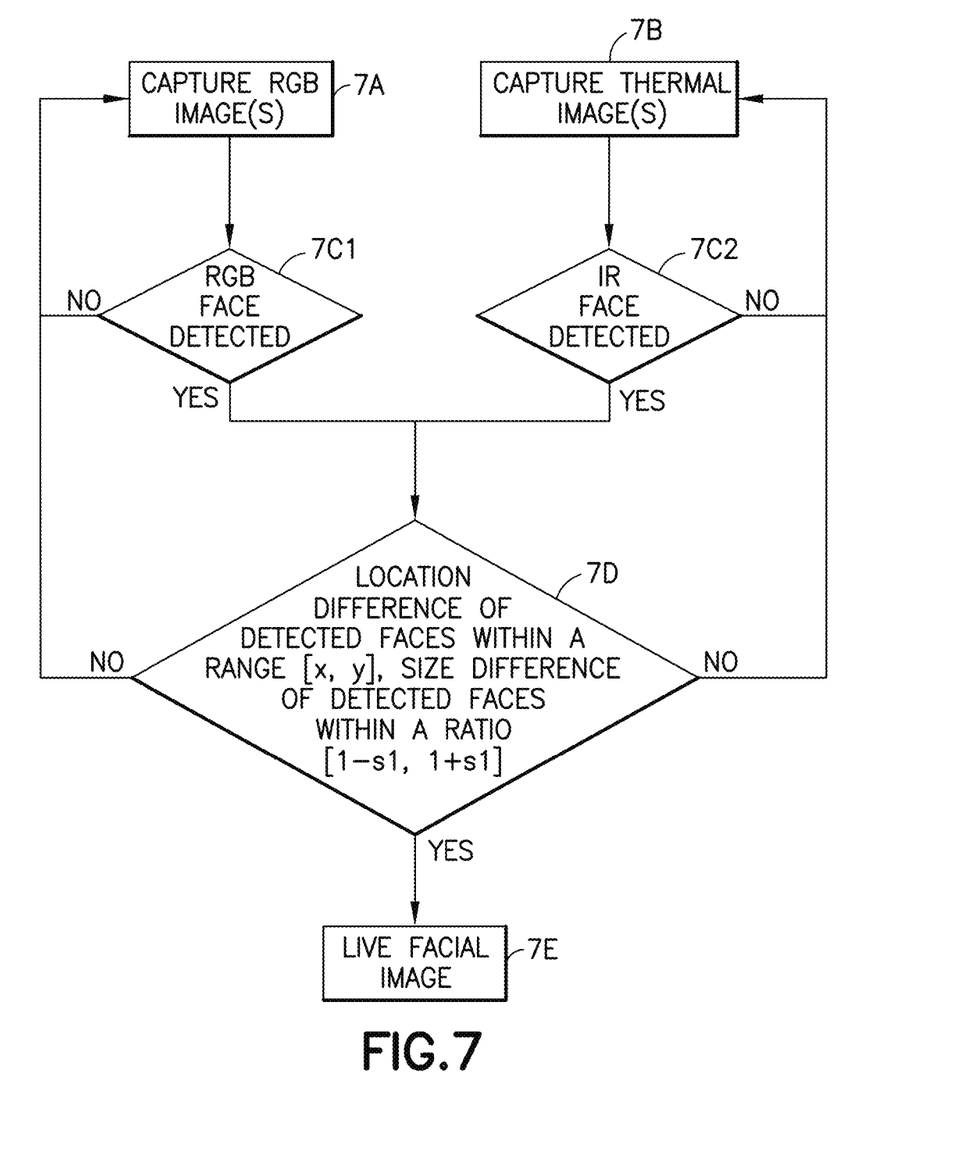
Figure 8:
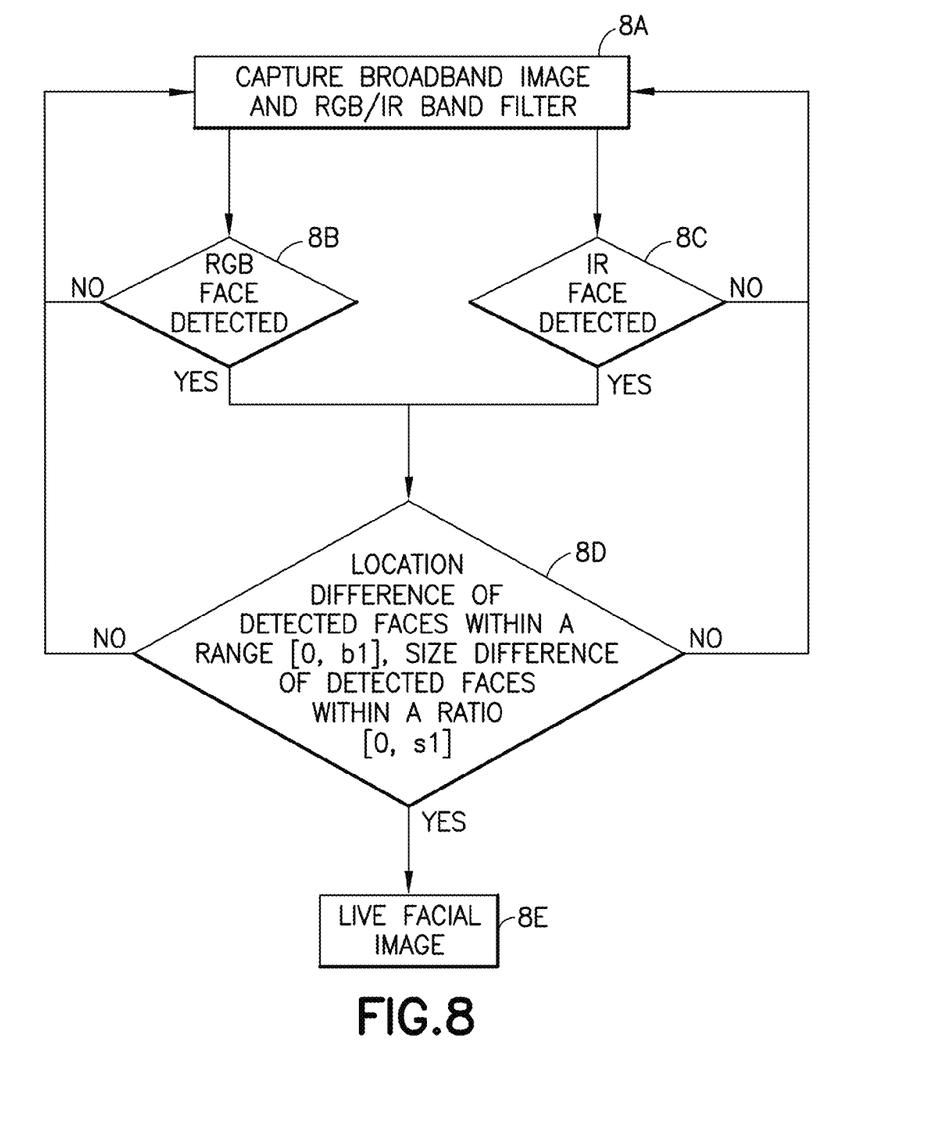

Further in accordance with embodiments of this invention the facial region image alignment steps 5D and 6D may be eliminated resulting in the somewhat simplified procedures depicted in FIGS. 7 and 8.

In FIG. 7 the steps 7A. 7B, 7C1 and 7C2 correspond to the steps 5A, 5B, 5C1 and 5C2 of FIG. 5. In this embodiment, and assuming that a face is detected in each of the RGB and thermal images, control passes to Block 7D where a test is made to determine if a location difference of the detected faces is within a range [x, y], and if a size difference of the detected faces is within a ratio [1−s1, 1+s1]. In this example [x, y] can be, for example, a difference of center coordinates, (x1, y1) and (x2, y2), of the two face regions. For example, [x, y] could (10-pixel-x-axis, 10-pixel-y-axis). In addition, s1 could be a difference in a size ratio, 1−(w1/w2) or 1−(h1/h2), of the detected face regions, where w1 is the detected width of the RGB face region, w2 is the detected width of the thermal face region, or where h1 is the height of the detected RGB face region and h2 is the height of detected thermal face region. In some embodiments both the width and the height of the detected face regions can be considered.

In FIG. 8 the steps 8A, 8B, 8C correspond to the steps 6A, 6B and 6C of FIG. 6, and step 8D corresponds to the step 7D of FIG. 7 except that, due to the fact that the single IR/RGB image sensor 24 is employed, the location difference of the detected faces is within a range [0, b1] and the size difference of the detected faces is within a range [0, s1].

The embodiments of this invention can be used for a variety of purposes. For example, the embodiments can be used to unlock a user's device (e.g., a smartphone or a tablet containing image sensor(s)) and enable user access by capturing images of the user's face. If it is determined that the imaged face is a live facial image that corresponds to the user (or to some other authorized person) then the user's device can be unlocked without requiring the user to enter a password. The use of the embodiments of this invention beneficially defeat a fraudulent attempt to access the user's device by simply placing a picture of the user before the image sensor since features of the RGB image of the user's face are required to be registered to within some tolerance with the features of the thermal image of the user's face.

The embodiments of this invention provide in one aspect thereof a method to identify a live face image using a thermal sensor and an RGB sensor. In the method there is a step of using both of the thermal and RGB sensors to capture a user's image. In the method there is another step of extracting image features obtained from the RGB sensor and detecting face regions. In the method there is another step, performed after detecting face region(s), of applying a similarity analysis on feature edge maps extracted from the thermal and RGB images. In the method a live face image may be recognized once facial regions found in the thermal image(s) passes a facial classifier test (e.g., the (Adaboost) classifier).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method, comprising:
capturing first image data of a person's face using at least one sensor responsive in a band of infrared wavelengths and capturing second image data of the person's face using the at least one sensor responsive in a band of visible wavelengths;
extracting image features in the image data and detecting face regions;
applying a similarity analysis to image feature edge maps extracted from the first and the second image data; and
recognizing a presence of a live face image after regions found in the first image data pass a facial features classifier that identifies a presence of an image of a human face in the first image data.

2. The method as in claim 1, further comprising, upon recognizing the presence of the live face image, verifying the identity of the person as an authorized person, and granting the person access to a resource.

3. The method as in claim 1, where the at least one sensor is comprised of a first sensor and a second sensor that are co-located in one device, or where the at least one sensor is comprised of a first sensor that comprises part of a device and a second sensor that comprises part of the same or a different device.

4. The method of claim 1, where applying the similarity analysis on image feature edge maps uses a gradient equation:

$$d^* = \underset{d}{\operatorname{argmin}} \sum_x \sum_y |E_t(x, y) - \tilde{E}_v^d(x, y)|^2,$$

where d* is an alignment distance, where $E_t(x,y)$ is the feature edge map of the first image data, and
where $\tilde{E}_v^d(x,y)$ is the feature edge map of the second image data with a displacement d.

5. The method as in claim 4, where facial image classification is performed only if the alignment distance is found to be located within a range of distances [r1, r2].

6. The method as in claim 1, where the facial features classifier is comprised of an adaptive boosting classifier operating with a plurality of weak facial feature classifiers.

7. The method as in claim 1, where the step of extracting image features is performed only if one of it is first determined that the second image data contains an image of a human face or it is first determined that both the first image data and the second image data each contain an image of a human face.

8. The method as in claim 1, where the similarity analysis comprises one or both of comparing a difference in center coordinates of the detected face regions and a difference in a size ratio of the detected face regions.

9. A system, comprised of at least one data processor connected with at least one memory that stores software instructions, where execution of the software instructions by the at least one data processor causes the system to:
capture first image data of a person's face using at least one sensor responsive in a band of infrared wavelengths and capture second image data of the person's face using the at least one sensor responsive in a band of visible wavelengths;
extract image features in the image data and detecting face regions;
apply a similarity analysis to image feature edge maps extracted from the first and the second image data; and
recognize a presence of a live face image after regions found in the first image data pass a facial features classifier that identifies a presence of an image of a human face in the first image data.

10. The system as in claim 9, where said system is further configured to, after recognizing the presence of the live face image, verify the identity of the person and if the person's identity is verified grant the person access to a resource.

11. The system as in claim 9, where the at least one sensor is comprised of a first sensor and a second sensor that are co-located in one device, or where the at least one sensor is comprised of a first sensor that comprises part of a device and a second sensor that comprises part of the same or a different device.

12. The system as in claim 9, where application of the similarity analysis on image feature edge maps uses a gradient equation:

$$d^* = \underset{d}{\operatorname{argmin}} \sum_x \sum_y \left| E_t(x, y) - \tilde{E}_v^d(x, y) \right|^2,$$

where d* is an alignment distance, where $E_t(x,y)$ is the feature edge map of the first image data, and where $\tilde{E}_v^d(x,y)$ is the feature edge map of the second image data with a displacement d, and where facial image classification is performed only if the alignment distance is found to be located within a range of distances [r1 r2].

13. The system as in claim 9, where the facial features classifier is comprised of an adaptive boosting classifier operating with a plurality of weak facial feature classifiers.

14. The system as in claim 9, where the system operates to extract image features only if it first determines that the second image data contains an image of a human face, or operates to extract image features only if it first determines that both the first image data and the second image data each contain an image of a human face.

15. The system of claim 9, where the similarity analysis comprises one or both of comparing a difference in center coordinates of the detected face regions and a difference in a size ratio of the detected face regions.

16. A computer program product comprised of software instructions on a computer-readable medium, where execution of the software instructions using a computer results in performing operations comprising:

capturing first image data of a person's face using at least one sensor responsive in a band of infrared wavelengths and capturing second image data of the person's face using the at least one sensor responsive in a band of visible wavelengths;

extracting image features in the image data and detecting face regions;

applying a similarity analysis to image feature edge maps extracted from the first and the second image data; and recognizing a presence of a live face image after regions found in the first image data pass a facial features classifier that identifies a presence of an image of a human face in the first image data.

17. The computer program product of claim 16, further comprising operations of, upon recognizing the presence of the live face image, verifying the identity of the person as an authorized person, and granting the person access to a resource.

18. The computer program product of claim 16, where the at least one sensor is comprised of a first sensor and a second sensor that are co-located in one device, or where the at least one sensor is comprised of a first sensor that comprises part of a device and a second sensor that comprises part of the same or a different device.

19. The computer program product of claim 16, where the operation of applying the similarity analysis on image feature edge maps uses a gradient equation:

$$d^* = \underset{d}{\operatorname{argmin}} \sum_x \sum_y \left| E_t(x, y) - \tilde{E}_v^d(x, y) \right|^2,$$

where d* is an alignment distance, where $E_t(x,y)$ is the feature edge map of the first image data, and where $\tilde{E}_v^d(x,y)$ is the feature edge map of the second image data with a displacement d, and where facial image classification is performed only if the alignment distance is found to be located within a range of distances [r1, r2].

20. The computer program product of claim 16, where the similarity analysis comprises one or both of comparing a difference in center coordinates of the detected face regions and a difference in a size ratio of the detected face regions.

* * * * *